Figure 1:
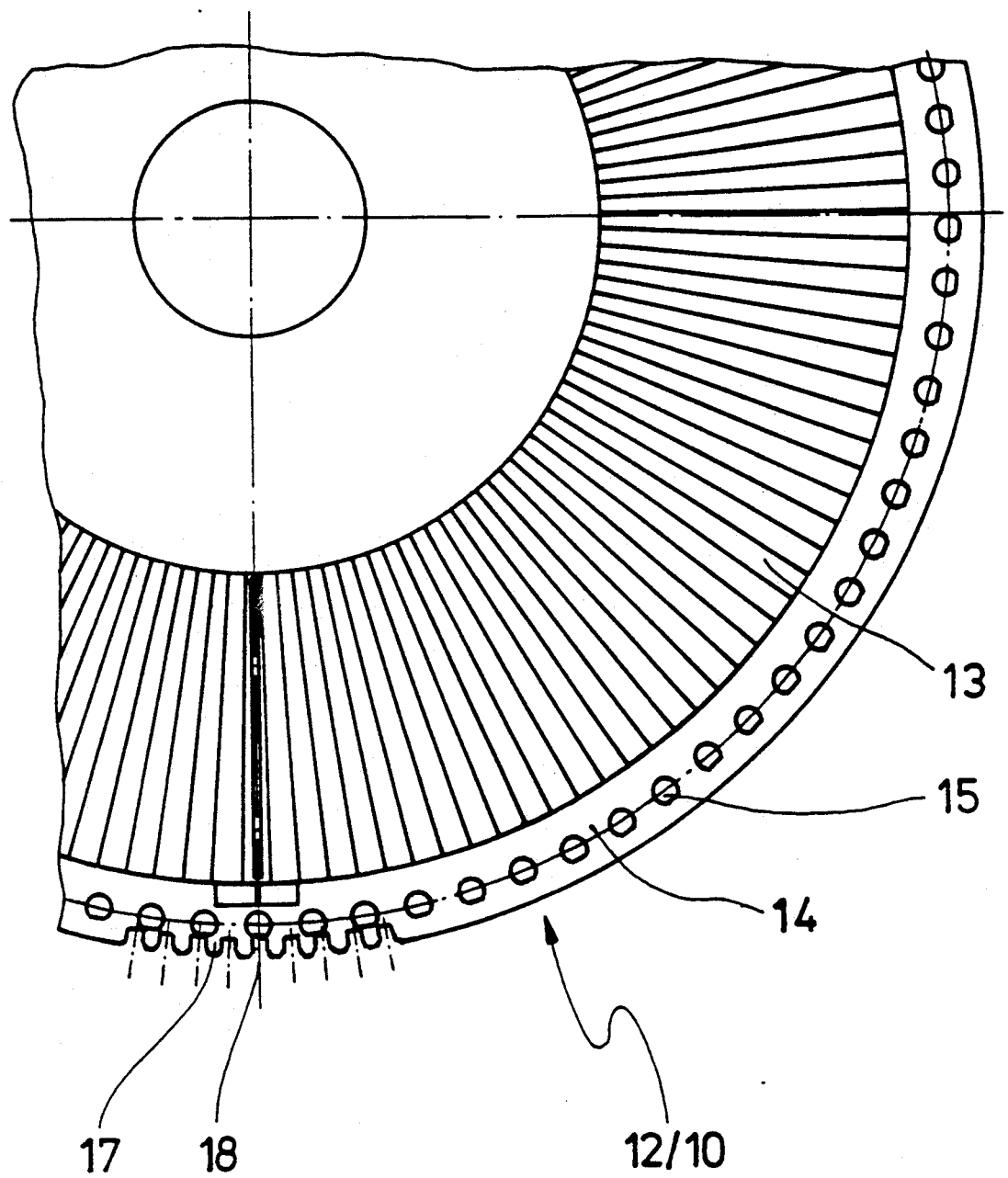

United States Patent [19]

Sachs, deceased

[11] Patent Number: 5,237,354
[45] Date of Patent: Aug. 17, 1993

[54] SLIDE PROJECTOR

[75] Inventor: Günter Sachs, deceased, late of Ostlfildern, Fed. Rep. of Germany, by Dora Sachs, executrix

[73] Assignee: Eastman Kodak Company, Rochester, N.Y.

[21] Appl. No.: 663,849

[22] PCT Filed: Sep. 26, 1989

[86] PCT No.: PCT/EP89/01125
§ 371 Date: Mar. 20, 1991
§ 102(e) Date: Mar. 20, 1991

[87] PCT Pub. No.: WO90/03596
PCT Pub. Date: Apr. 5, 1990

[30] Foreign Application Priority Data
Sep. 27, 1988 [DE] Fed. Rep. of Germany ....... 3832675

[51] Int. Cl.⁵ .................. G03B 23/06; G03B 23/14
[52] U.S. Cl. ................... 353/117; 353/103; 353/118
[58] Field of Search ........... 353/117, 118, 107, 103, 353/111

[56] References Cited
U.S. PATENT DOCUMENTS 3,586,433  6/1971  Mulch ........................ 353/117
3,644,031  2/1972  Bennett ...................... 353/117
3,697,161  10/1972 Blecher ...................... 353/107
4,253,789  3/1981  Hultgren ..................... 353/117
4,402,584  9/1983  Palmer ....................... 353/117
4,406,531  9/1983  Karl et al. .................. 353/117

Primary Examiner—William A. Cuchlinski, Jr.
Assistant Examiner—William C. Dowling
Attorney, Agent, or Firm—Marianne J. Twait

[57] ABSTRACT

A slide projector which is adapted for the use of circular trays (10, 12) having different numbers of slide compartments and which includes a pulse-controlled electronic switch unit for controlling a transport motor selectively moving one of the trays (10, 12) forwardly or backwardly comprises a slider (30) for fixing the trays (10, 12) in position, which slider can be actuated by the electronic switch unit following each indexing of the tray and which can be brought into engagement with both transport pins (15) associated with the compartments of the first circular tray (10) and serving as transport and fixing means and with a toothing (17) associated with the compartments of the second circular tray (12) and serving as transport and fixing means, following each indexing of the tray such engagement being achieved by fixing means (34, 35) associated with the transport and fixing means (15, 17) of the trays and adapted to the shape and size thereof.

10 Claims, 4 Drawing Sheets

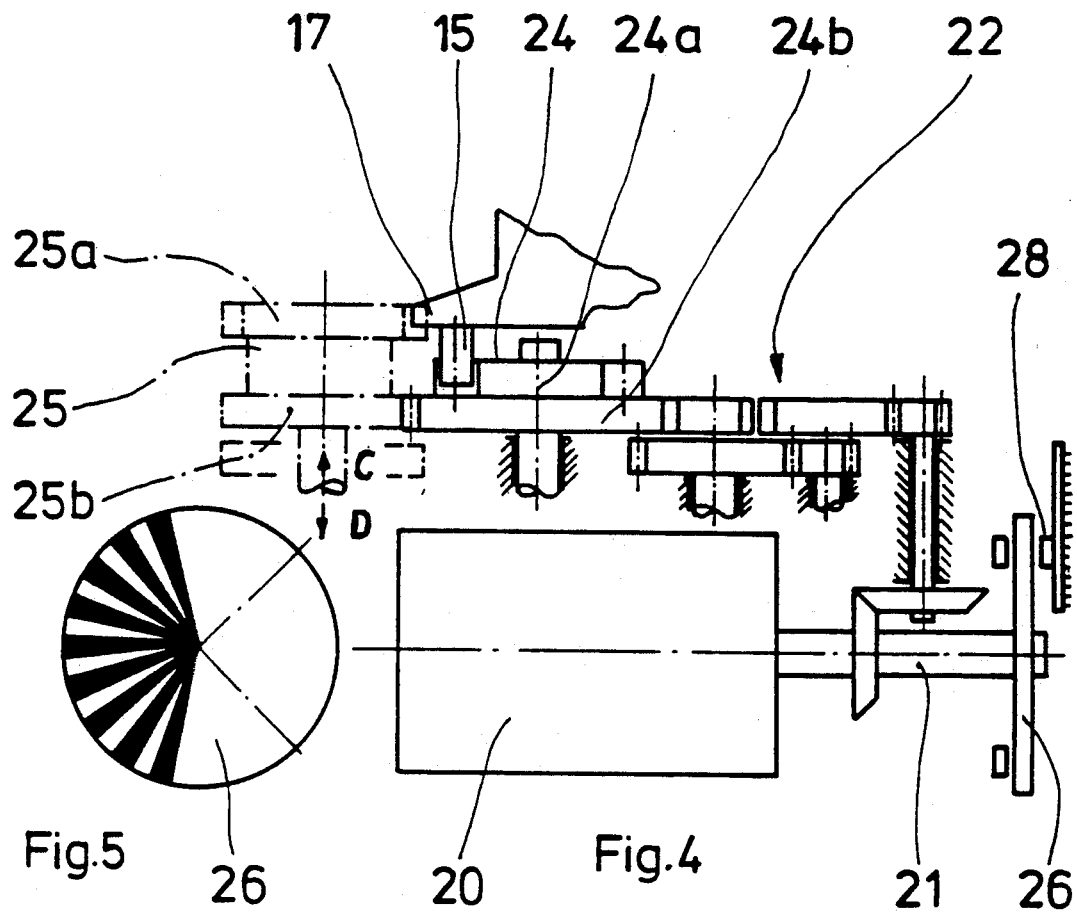
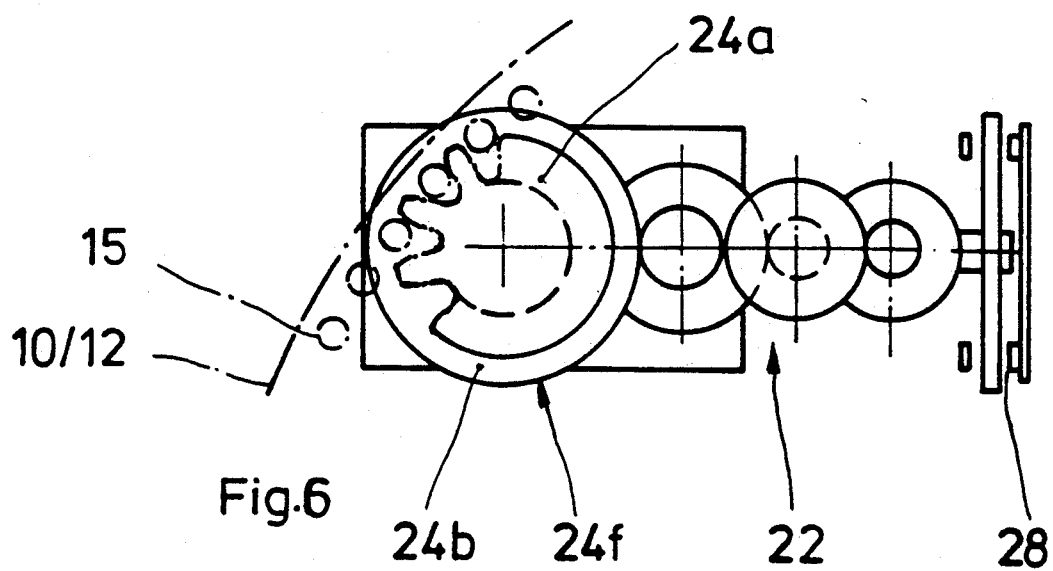

SLIDE PROJECTOR

DESCRIPTION

The subject matter of the invention relates to a slide projector which is adapted for use with circular trays having different numbers of slide compartments and has a pulse-controlled electronic switch unit for controlling a transport motor which is adapted to selectively move the circular trays in the forward or backward direction and which has, moreover, a tray-fixing means.

A projector of the generic type which is a dissolve projector having two projection systems is known from U.S. Pat. No. 4,416,520. It is adapted to accommodate both a circular tray with a smaller number of slide compartments and a circular tray With a reater number of slide compartments. Both circular trays are provided with downwardly extending pins. The tray-fixing means of this known projector consists of a Maltese-cross transmission seated on a driving shaft, said transmission actuating a slide lifting and lowering lever and being connected via an actuating rod with a pivot lever having a locking nose which can be pivoted into a position between two transport pins for fixing the tray.

Owing to its multitude of movable and complex components, this tray-fixing means is complicated and expensive.

It is the object of the invention to provide a slide projector of the type described above wherein the fixing means consists of one single movable and uncomplicated component which is easy to produce and which is not operatively connected with other assembly groups. Moreover, the means is to allow trays without pins to be fixed.

In accordance with the invention this object is attained in that a slider is provided which can be actuated by the electronic switch unit following each indexing of the tray, said slider being brought into engagement with separate transport and fixing means associated with the compartments of each circular tray, following each indexing movement of the tray.

According to a useful modification of the invention the slider comprises counter-fixing means associated with the transport and fixing means and adapted to the shape and size thereof.

According to a further useful modification of the invention the counter-fixing means consist of a first projection arranged in the area of the free end of the slider and of a second projection located at a distance of said first projection, the engagement surfaces of said projections facing each other and being aligned in the direction of movement of the slider.

Figures 2, 3:
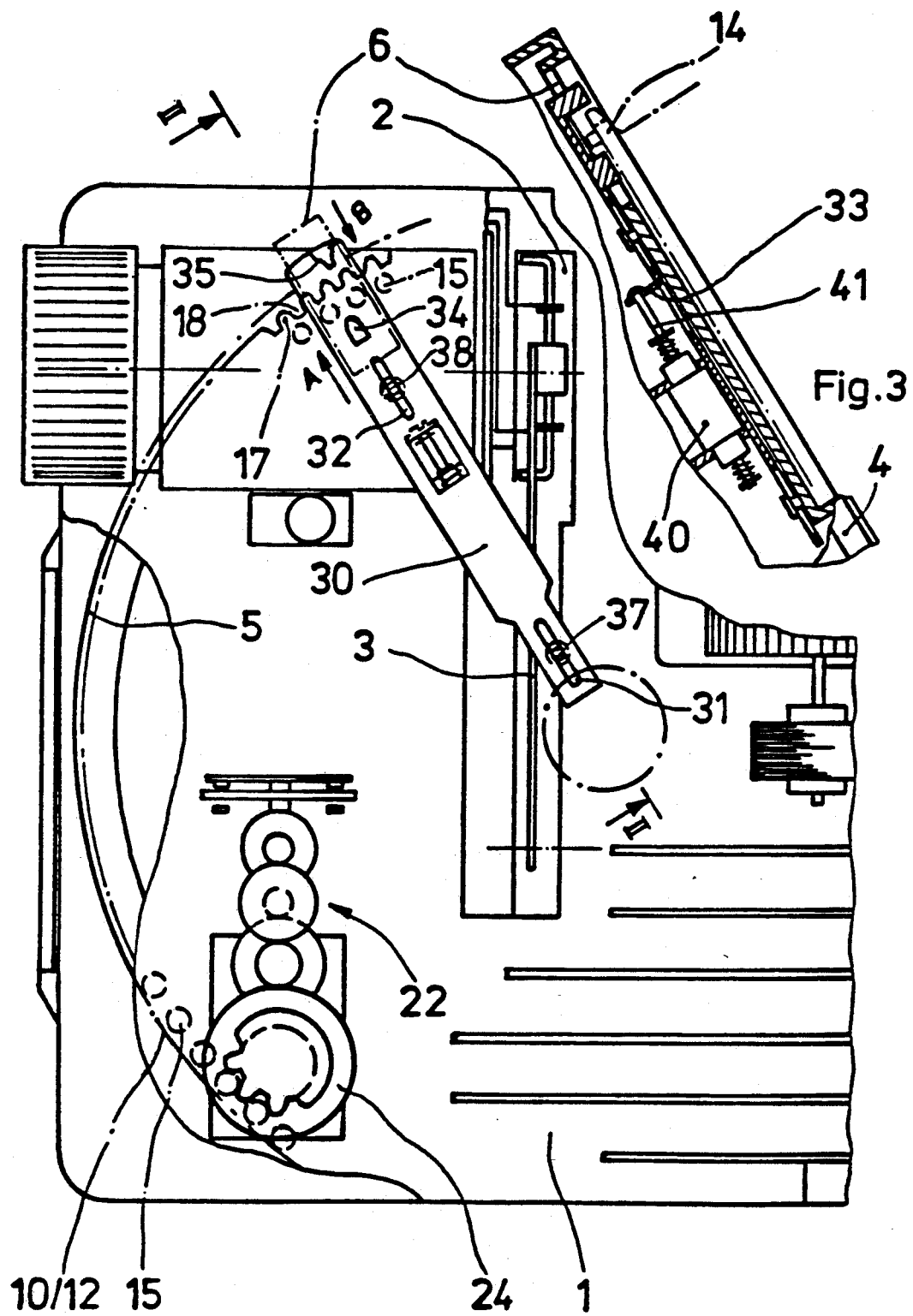

Further features and advantages can be inferred from the subclaims as well as from the description of a number of embodiments of the invention illustrated in the drawings wherein:

FIG. 1 shows a partial view from below of a circular slide tray with transport and fixing means, FIG. 2 shows a plan view of a slide projector for a circular slide tray according to FIG. 1 with a tray-fixing means and a tray-transport device, FIG. 3 shows a sectional view along line II—II in FIG. 2 of the tray-fixing means according to FIG. 2, FIG. 4 shows a lateral view of the tray-fixing means according to FIG. 2, FIG. 5 shows an elevational view of a control member of the tray-transport device according to FIG. 2, FIG. 6 shows a plan view of the tray-transport device according to FIGS. 2 and 4, and FIGS. 7 and 8 each show a partial sectional view of a tray with, and without a recess for the actuation of the switch.

FIG. 1 shows a circular tray with 141 slide compartments for 140 slides. It has substantially the same shape and size as a circular tray with 81 slide compartments for 80 slides while featuring an additional toothing 17 on the circumference of the ring 14 provided with 81 transport pins, each of the 141 slide compartments being associated with a tooth gap 18 of the toothing 17. In the following description, the circular tray for 80 slides bears the reference numeral 10 and the circular tray for 140 slides the reference numeral 12.

In the embodiment illustrated the two circular trays 10 and 12 are transported by means of an indexing wheel 24 of a motor-driven gear drive 22, said indexing wheel engaging between the transport pins 15 (FIGS. 2, 4 and 6). In the case of the first tray 10 with 81 slide compartments, the transport pins 15 serve at the same time as fixing means whereas in the case of the second tray 12 with 141 slide compartments, the fixing means consist of the toothing 17.

In order that each slide compartment located above the slide gate 2 be precisely positioned during forward and backward transport of the tray 10 or 12, a fixing means is provided which, as shown in FIG. 2, substantially consists of a slider 30 arranged in the area of the slide gate 2. The slider 30 is shiftably guided and held on the inner surface of the upper housing portion of the projector by means of pin-and-slot arrangements 31, 37 and 32, 38. The slider 30 extends radially outwardly from the area of a mounting spindle 4 adapted to receive the tray 10 and 12 respectively up to the marginal area of a circular recess 5 in the upper portion 1 of the housing into which the tray 10 and 12 respectively is inserted.

A first projection 34 and a second projection 35 located at a distance therefrom are provided in the area of the free end of slider 30. The first projection 34 is associated with the transport pins 15 of tray 10 and the second projection 35 is associated with the toothing 17 of tray 12. Both projections comprise engagement surfaces which face each other and are aligned in the direction of movement "A" and "B" respectively of slider 30 and which are dapted to the shape and size of the gaps between the pins and the gaps between the teeth 18 respectively. Both projections 34 and 35 extend through a window-type opening 6 in the marginal area of the circular recess 5 in the upper portion 1 of the housing (FIGS. 2 and 3).

In order to actuate slider 30, a commercially available double-stroke or reversing magnet 40 is provided which is frictionally connected with a bent-off portion 33 of slider 30 and mounted on two ledges of the upper portion of the housing. When slider 30 is in its initial condition, it is held by the double-stroke or reversing magnet 40 in a middle position. This position also corresponds to the zero position of magnet 40. As can be seen from FIGS. 2 and 3, the transport pins 15 and the toothing 17 of the circular tray 10 and 12 respectively inserted in the upper portion 1 of the housing of the projector extend in this position between the facing engagement surfaces of the two projections 34 and 35 of slider 30.

The indexing of the tray is controlled by a pulse-controlled electronic switch unit which is designed such that the tray-transport motor 20 is arrested when it has received 188 pulses. However, the tray-transport motor may also be arrested after having received 108 pulses only.

FIG. 4 shows the way in which a control disk 26 is arranged on motor shaft 21. As illustrated in FIG. 5, the control disk comprises 47 black and white sectors which are scanned by optical means 28. Each of said sectors triggers a pulse which controls the electronic switch unit.

Figure 7:
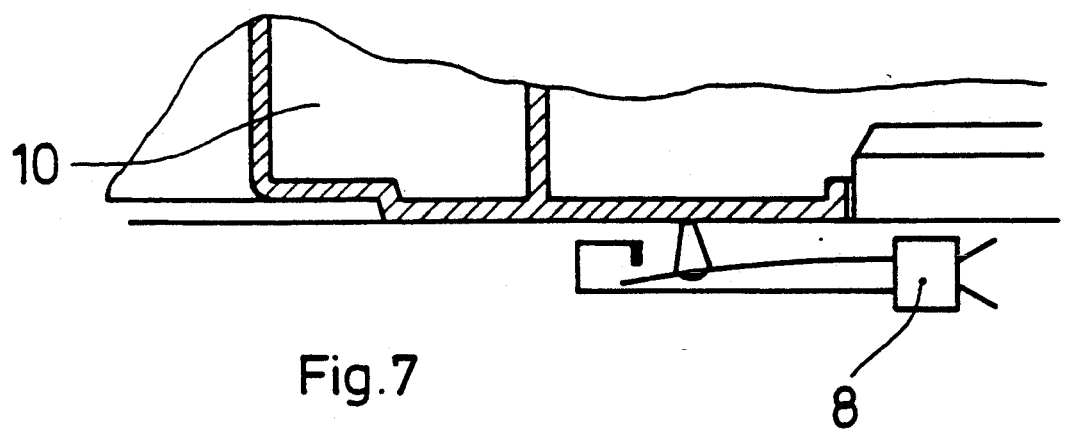

When a circuler tray 10 with 81 slide compartments (80 slides) is used a switch 8 is held in its open position by tray 10 as can be seen in FIG. 7. Consequently, during transport of the tray the motor 20 is arrested after the control disk 26 has carried out four rotations each, and 188 pulses have been fed to the electronic control unit. As a result of this operation, tray 10 has been advanced via gear drive 22 and indexing wheel 24 by just one slide compartment. Subsequently the double-stroke or reversing magnet 40 is actuated by the electronic control unit and, in a forward stroke, shifts slider 30 in the direction of the arrow "A" so that the wedge-shaped engagement surface of projection 34 is moved between the pins 15 of tray 10. Tray 10 is now fixed in a position in which a slide compartment is located above the opening of slide gate 2. When the tray-transport switch (not illustrated) is actuated slider 30 is transferred back to its initial position and middle position respectively by means of the double-stroke or reversing magnet 40, before the subsequent forward or backward transport step of the tray occurs, projection 34 being disengaged from transport pin 15 during such operation (FIG. 2).

Figure 8:
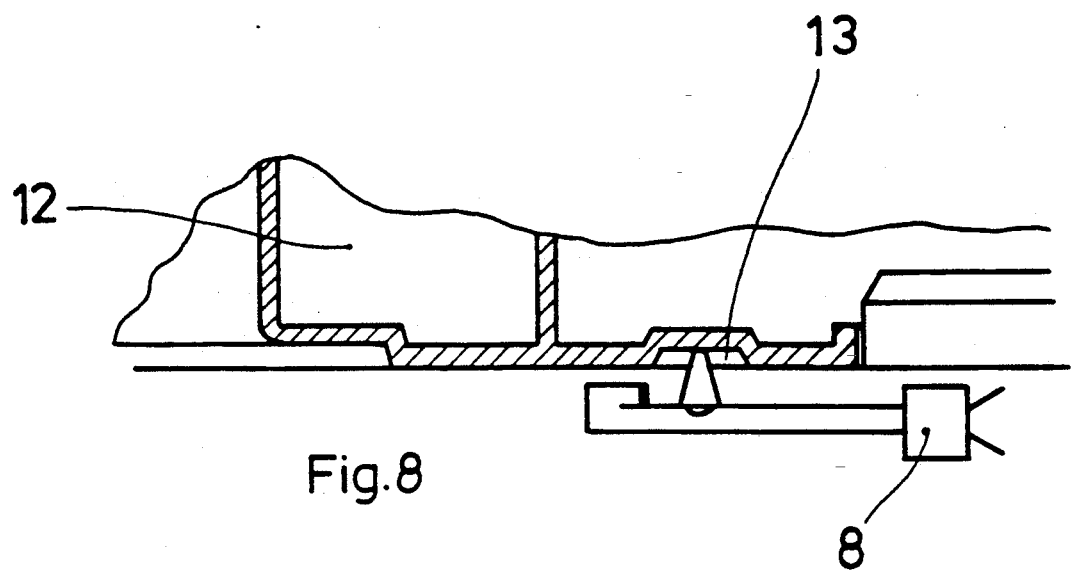

When a circular tray 12 is used, which includes 141 slide compartments (140 slides) the contact element of switch 8 can drop into a round circumferential recess 13 of tray 12 and is closed thereby (FIG. 8). As a result, the electronic control unit is now in a position to receive 108 pulses only and the tray-transport motor is arrested after 2.3 rotations of the control disk 26. The circular tray 12 is thus advanced by one slide compartment. The double-stroke or reversing magnet 40 actuated directly afterwards by the electronic control unit now moves slider 30 in the direction of the arrow "B", with the second projection 35 of the slider being received in a tooth gap 18 of toothing 17. Before tray 12 is further advanced after a slide-changing operation, slider 30 is once again transferred to its initial position and middle position respectively by means of the double-stroke or reversing magnet 40, the second projection 35 being removed from tooth gap 18 and disengaged from toothing 17.

As can be seen from FIGS. 4 and 5, the indexing wheel 24 consists of two superimposed wheels 24a and 24b of which the uppermost wheel 24a features the indexing teeth whereas the lower wheel 24b is held in engagement with the gear drive 22.

As illustrated in FIG. 4, the tray 10 and 12 respectively may be driven via the fixing teeth 17 rather than via the pins 15. In that case the fixing teeth 17 also form the transport toothing. This toothing is engaged by an indexing wheel 25, shown in dash-dotted lines in FIG. 4, which also consists of two superimposed wheels 25a and 25b, the upper wheel 25a having an indexing toothing which is adapted for engagement with the fixing teeth 17.

The indexing wheel 24 then only consists of the lower wheel 24b which serves as an intermediate gear and does not engage the pins 15.

It is also readily conceivable that the indexing wheel 25 be shiftable in the axial direction. As can also be seen from FIG. 4, tray 10, which is provided with transport pins 15, is in such case driven by the indexing wheel 24 whereas the toothing of the lower wheel 25b of indexing wheel 25 is disengaged from the toothing of the lower wheel 24b of indexing wheel 24 due to an axial displacement in the direction of the arrow "D".

Should a third tray without transport pins but with a fixing and transport toothing 17 be used, the indexing wheel 25 would be brought into engagement with the fixing and transport teeth of that tray by its toothing 25a due to an axial displacement in the direction of the arrow "C".

The slide projector according to the invention is advantageous in that only one single slider 30 provided with counter-fixing means 34 and 35 is necessary to fix circular trays having different numbers of slide compartments and different transport and/or fixing means.

We claim:

1. A slide projector which is adapted for use with a first circular tray (10) with a predetermined number of slide compartments or with a second circular tray (12) with a greater number of slide compartments, said slide projector having a pulse-controlled electronic switch unit for controlling a transport motor (20), the transport motor is adapted to selectively rotate the circular trays (10,12) in a first direction of rotation or in a second direction of rotation reverse to said first direction of rotation, said slide projector having, moreover, a tray fixing means to be brought in engagement with separate transport and fixing means (15,17) associated with the compartments of each of said circular trays (10,12) for fixing the slide compartment in a position located above an image gate in the slide projector, characterized in that said tray fixing means comprises a slider (30) arranged to move in a radial direction with regard to the respective circular tray used, said slider (30) comprising counter fixing means which consist of a first projection (34) and a second projection (35) with engagement surfaces to be engaged with the separate transport and fixing means (15,17) of the circular tray used, said projections (34,35) facing each other and being aligned in said radial direction, and means coupled with the pulse-controlled electronic switch unit for detecting the presence of the first circular tray (10) or the second circular tray (12), wherein the movement of said slider (30) from a middle position into one of two opposite directions (A,B) is controlled by said electronic switch unit in dependence from the circular tray (10,12) used.

2. Slide projector according to claim 1, characterized in that the projections (34, 35) of slider (30) are by their shape and size adapted to the separate transport and fixing means (15, 17) of the circular tray used.

3. Slide projector according to claim 2, characterizad in that the first projection (34) is provided in the area of the free end of the slider (30) and the second projection (35) is provided at a distance from said first projection and in that the engagement surfaces of said projections face each other.

4. Slide projector according to claim 1, charactarizsd in that the slider (30) is held in a middle position when in its initial condition and in that the separate transport and fixing means (15, 17) of the circular tray (10, 12) placed on the projector extend between the facing engagement surfaces of the two projections (34, 35).

5. Slide projector according to claim 1, characterized in that for actuating slider (30). a double-stroke or reversing magnet (40) is provided which is frictionally connected with a bent-off portion (33) of slider (30) and controllable by tha electronic switch unit.

6. Slide projector according to claim 1, characterized in that the separate fixing means of slide tray (10), which have a predetermined number of slide compartments, consist of transport pins (15) molded to a pinbearing ring (14) and in that in the final position of the slider (30) and in the case of a forward stroke in the direction (A) starting from the middle position thereof. the first projection (34) engages between two transport pins (15) for fixing the circular tray (10) following an indexing movement of the tray.

7. Slide projector according to claim 1, characterized in that the separate fixing means of the circular tray (12) with the greater number of slide compartments engage a toothing (17) additionally provided on the circumferential surface of the pin bearing ring (14) for fixing the second circular tray 12) following an indexing movement.

8. Slide projector according to claim 1, charactarized in that the fixinq toothing (17) also forms the transport toothing which is engaged by an indexing wheel (25) and in that in the end position of the slider (30) and in the case of a reverse stroke in the diraction (B) starting from the middle position thereof, the engagement surface of the second projection (35) engages in the gap (18) between two teeth of said transport toothing for fixing the circular tray (12) following an indexing movement.

9. Slide projector according to claim 5, characterized in that the lower side of the circular tray (12) with the greater number of slide compartments comprises a circular recess (13) for actuating a switch (8) which switches not only the pulse-controllad electronic switch unit but also the double-stroke or reversing magnet (40).

10. Slide projector according to claim 1, characterized in that the slider (30) is arranged adjacent to the image gate (2) and in that the two projections (34, 35) extend through a window-type opening (6) in a circular recess (5) in the upper portion of the projector housing, said recess receiving one of the circular trays (10 and 12 respectively).

* * * * *